United States Patent [19]

Schweitzer, Jr.

[11] 3,708,724

[45] Jan. 2, 1973

[54] SIGNALLING SYSTEM RESPONSIVE TO FAULT ON ELECTRIC POWER LINE

[73] Inventor: Edmund O. Schweitzer, Jr., Northbrook, Ill.

[73] Assignee: E. O. Schweitzer Manufacturing Co., Inc., Mundelein, Ill.

[22] Filed: March 31, 1972

[21] Appl. No.: 239,930

[52] U.S. Cl.............317/22, 317/33 SC, 324/133, 340/253 A
[51] Int. Cl. .............................................G01r 13/00
[58] Field of Search..............324/132, 133, 127, 51; 340/253 A, 255, 373; 317/22, 33 SC, 33 C

[56] References Cited

UNITED STATES PATENTS 3,426,275  2/1969  Schweitzer .........................324/127
3,426,276  2/1969  Schweitzer .........................324/127
3,676,740  7/1972  Schweitzer .........................317/22

*Primary Examiner*—James D. Trammell
*Attorney*—Robert R. Lockwood

[57] ABSTRACT

One or more reed switches have contacts that are held closed on normal energization or current flow in an alternating current conductor and are opened on flow of alternating current in the conductor above a predetermined value. The switch or switches may be potted in a cavity in an insulator supporting the conductor. A rectifier energized from the conductor charges a capacitor the discharge from which through winding means effects closure of the contacts.

16 Claims, 5 Drawing Figures

PATENTED JAN 2 1973

TO SIGNALLING CIRCUIT

SIGNALLING SYSTEM RESPONSIVE TO FAULT ON ELECTRIC POWER LINE

This invention constitutes an improvement over the systems disclosed in application, Ser. Nos. 55,532, filed July 16, 1970; 119,639, filed March 1, 1971; 148,440, filed June 1, 1971; and 148,687, filed June 1, 1971 now U.S. Pat. No. 3,676,740.

Among the objects of this invention are: to provide a signalling system that can be employed to indicate at a remote point whether or not alternating current above a predetermined magnitude or fault current has flowed in a high voltage conductor; to control operation of a reed switch by a magnetic core that is magnetized under conditions of normal energization of the conductor and is demagnetized on flow of fault current in the conductor; to employ one or more reed switches having contacts carried by magnetic supports and controlled by the alternating magnetic flux generated by alternating current flow in a conductor to provide a signal by the position of the contacts to indicate whether fault current has flowed in the conductor; and to position the signalling system in the base of an insulator on which the conductor is mounted.

In the drawings

Figure 1:
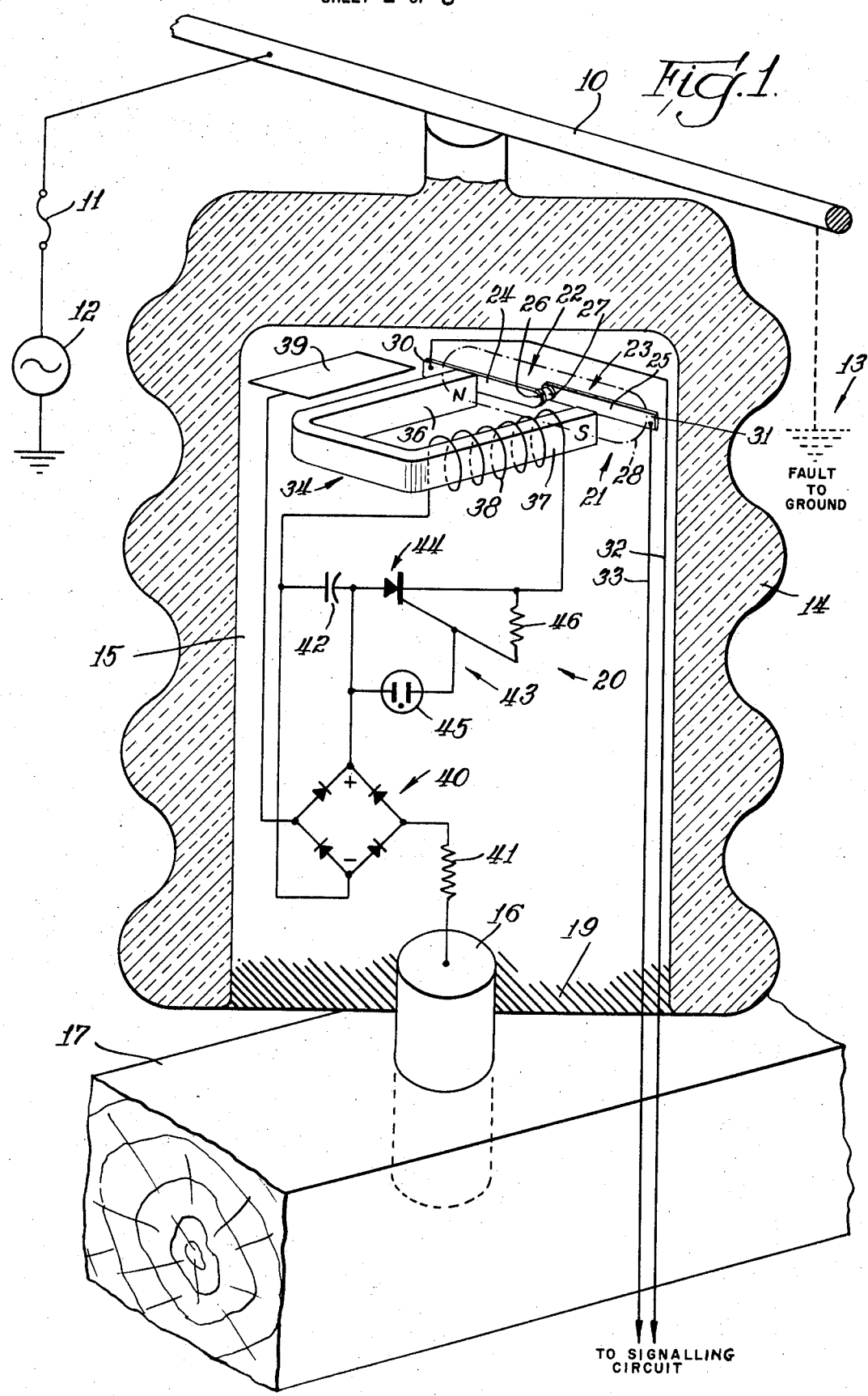
FIG. 1 illustrates diagrammatically and in perspective one embodiment of the signalling system of this invention.

In Fig. 1 reference character 10 designates an alternating current conductor that may be energized through a fuse 11 from a source 12 of alternating current. The conductor 10 may be energized at any suitable distribution voltage such as 14 Kv above ground. However, it will be understood that other voltages may be employed. The conductor 10 is illustrated as possibly having a fault 13 to ground, illustrated by broken lines, in which case the fuse 11 flows and opens the circuit between the source 12 and the conductor 10. It is desirable to have an indication at a remote point that a fault has occurred so that appropriate action can be taken as may be required to restore energization of the conductor 10. The present invention is directed to a signalling system for this purpose.

It will be observed that the conductor 10 is carried by an insulator 14 which may be formed of porcelain. The insulator 14 is provided with a cavity 15 and is arranged to be carried by a metallic pin 16 that extends upwardly form a cross arm 17 that may be formed of wood. It will be understood that this mounting for the conductor 10 is described and shown as illustrative of suitable mountings for the conductor 10.

Within the cavity 15 of the insulator 14 there is provided a signalling system that is indicated, generally at 20. After the signalling system 20 has been assembled in the cavity 15 the remaining space is filled with potting compound 19.

The signalling system 20 includes a switch, in indicated generally at 21 which preferably is a reed switch having magnetic contacts that are indicated at 22 and 23 and are normally spring biased to open position. The magnetic contacts 22 and 23 include arms 24 and 25 of magnetic material carrying contacts 26 and 27 at their distal ends. These contacts 26 and 27 may be formed of arc resisting material. The magnetic contacts 22 and 23 are enclosed in an envelope 28 in accordance with conventional practice. Contact terminals 30 and 31 extend from the envelope 28 and from the arms 24 and 25 tO which conductors 32 and 33 can be connected. As illustrated the conductors 32 and 33 extend from the cavity 15 through the potting compound to a signalling circuit which may be employed as desired to provide an indication that the conductor 10 is either energized or deenergized depending upon whether the contracts 26 and 27 are closed or are open.

For controlling the positions of the magnetic contacts 22 and 23 there is provided a U-shaped magnetic core that is formed of relatively low coercive force magnetic material. The magnetic core 34 includes arms 36 and 37 that are arranged to be polarized as indicated. The distal ends of the arms 36 and 37 are positioned adjacent the terminals 30 and 31 of the reed switch 21 for a purpose that presently will be apparent. A winding 38 located on the arm 37 is arranged to be energized with direct current for polarizing the distal ends of the arms 36 and 37 to the polarities indicated.

For energizing the winding 38 a charging circuit is employed. The charging circuit includes a counterpoise 39 which is located in spaced relation to the conductor 10 and within the cavity 15 of the insulator 14. A full wave rectifier 40 is connected to the counterpoise 39 at one terminal and its other terminal is connected through a resistor 41 to the metallic pin 16. This arrangement provides for taking advantage of the voltage drop between the counterpoise 39 and the metallic pin 16 which is nearer to ground than the counterpoise 39 for the purpose of energizing the full wave rectifier 40 and charging a capacitor 42. The capacitor 42 is arranged to be discharged periodically through the winding 38 under the control of a trigger circuit that is indicated at 43. The trigger circuit 43 includes an SCR 44 having a space discharge device 45, such as a neon lamp, connected between the anode and gate. It also includes a resistor 46 connected between the gate and the cathode of the SCR. When the charge on the capacitor 42 reaches a predetermined value, the space discharge device 45 becomes conducting and, in turn, causes the SCR to become conductive, thereby permitting the charge on the capacitor 42 to be applied to the winding 38.

When the winding 38 is energized in the manner described the distal ends of the arms 36 and 37 are magnetized with the polarities indicated. As a result the arms 24 and 25 of magnetic material which carry the contacts 26 and 27 are magnetized sufficiently to overcome the inherent spring bias holding the contacts 26 and 27 open. The contacts 26 and 27 then are closed and remain closed as long as the conductor 10 remains energized.

In the event of flow fault current in the conductor 10 sufficient to blow the fuse 11, the circuit is opened. As an incident to the flow of fault current in the conductor 10 the alternating magnetic field generated around it is sufficient to demagnetize the arms 36 and 37. The inherent spring bias of the arms 24 and 25 of the reed switch 21 then is sufficient to separate the contacts 26 and 27. This opens the connection between the conductors 32 and 33 to the signalling circuit, thereby providing a signal that fault current has flowed in the conductor 10 and that the fuse 11 has blown. The contacts 26 and 27 remain open until the fault is removed from the conductor 10, the fuse 11 is replaced and the conductor 10 is reenergized.

Figure 2:
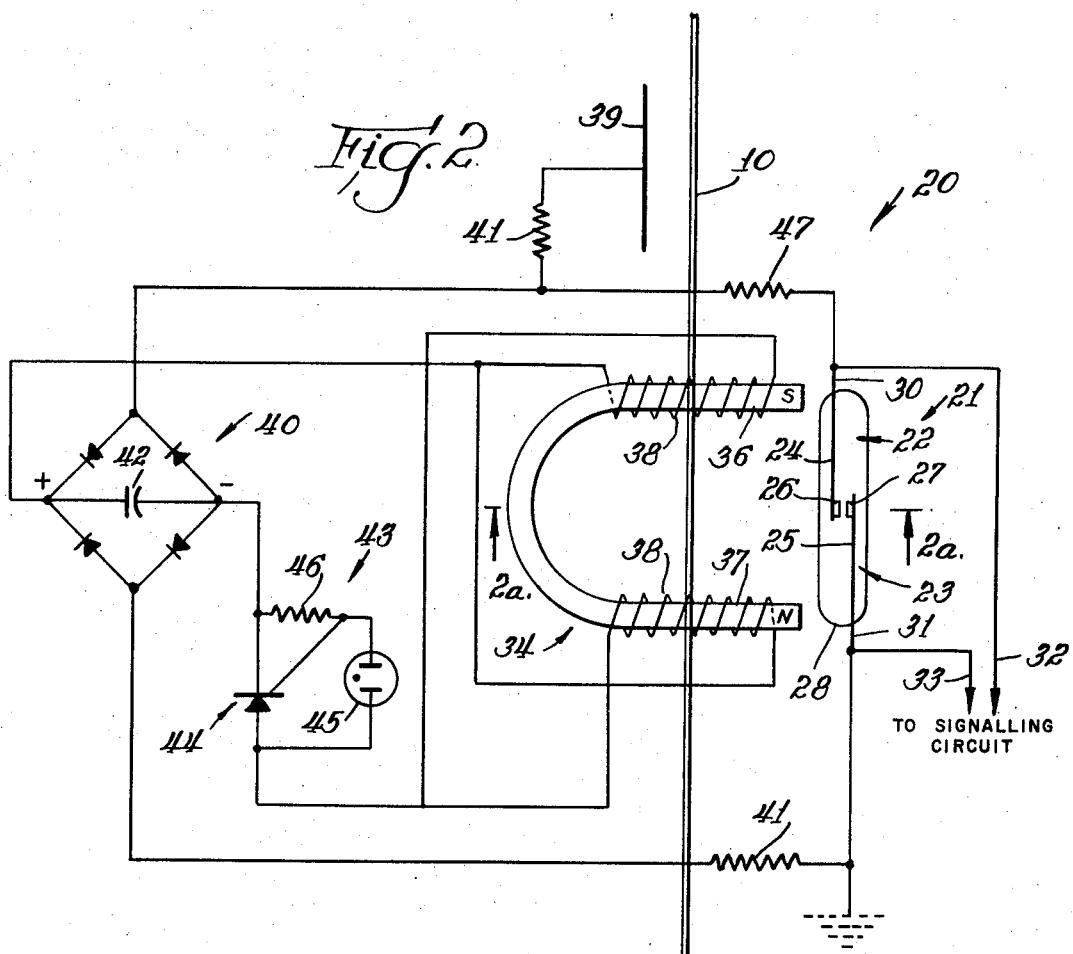
FIG. 2 shows diagrammatically the circuit connections illustrated in FIG. 1 modified to a certain extent.

In FIG. 2 the signalling circuit 20, previously described, is illustrated again. It may be undesirable to apply repeated pulses of direct current to the magnetizing windings 38, one winding being shown on each of the arms 36 and 37, since the U-shaped magnetic core 34 has sufficient retentivity to maintain the contacts 26 and 27 of the reed switch 21 closed once the initial pulse has been received. For this purpose the rectifier 40 can be connected through a resistor 47 to the contact terminal 30 of the reed switch 21. As soon as the contacts 26 and 27 are closed as a result of the first impulse or impulses applied to the windings, 38, the rectifier 40 is shunted and additional impulses are not applied.

Figure 2A:
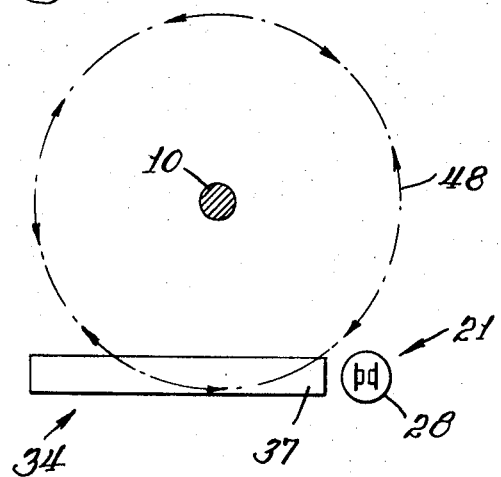
FIG. 2a is a view taken generally along line 2a—2a of FIG. 2 and shows the relationship between the alternating magnetic field around the conductor and the magnetic core.

FIG. 2a illustrates at 48 the alternating flux path around the conductor 10 which is generated as a result of flow of alternating current therethrough. The U-shaped magnetic core 34 is illustrated in its position with respect to the alternating magnetic flux 48. It will be understood that on one-half cycle of the alternating magnetic flux one of the arms, for example the arm 36, is demagnetized then on the succeeding half cycle of alternating magnetic flux in the opposite direction the arm 37, for example, is demagnetized.

Attention is directed to the fact that the relationship between the signalling circuit 20 and the conductor 10 is such that the demagnetizing action of the alternating magnetic flux on the arms 36 and 37 of the magnetic core 34 is sufficiently effective only on flow of alternating current in the conductor 10 above a predetermined value. As long as normal load current flows in the conductor 10 the demagnetizing action of the alternating magnetic flux generated around the conductor 10 is insufficient to effect sufficient demagnetization of the arms 36 and 37 to permit the biasing action of the arms 24 and 25 of the reed switch 21 to open the contacts 26 and 27.

Figure 3:
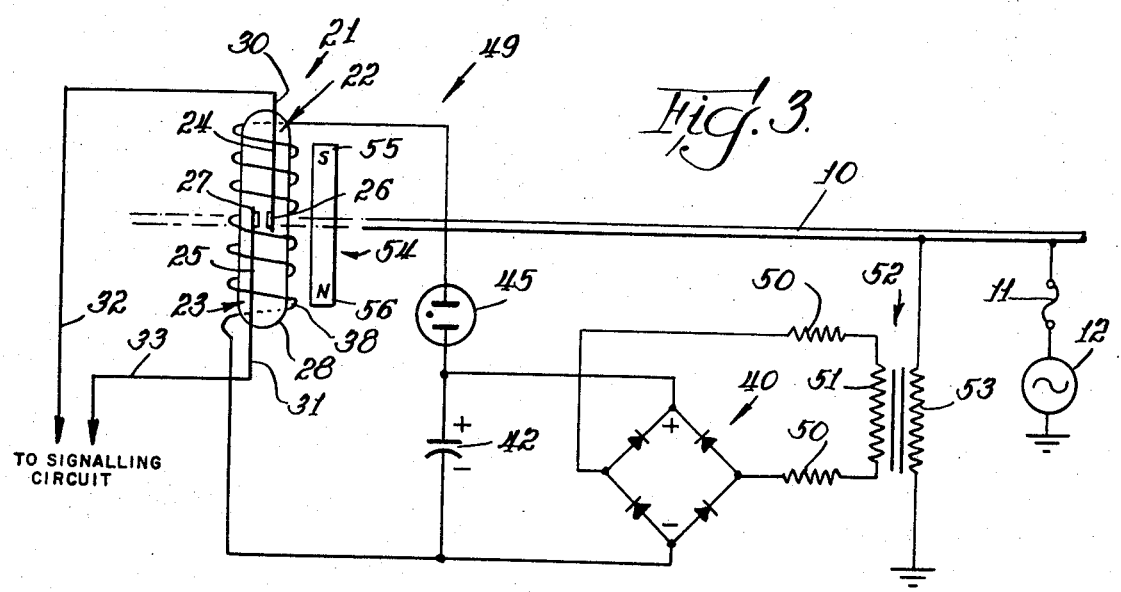
FIGS. 3 and 4 show diagrammatically further embodiments of this invention.

In FIG. 3 the reference character 49 designates, generally, another embodiment of the signalling circuit in which the winding 38 is located around the reed switch 21. The longitudinal axis of the reed switch 21 is located along the lines of alternating magnetic flux that are generated on flow of alternating current in the conductor 10. The winding 38 is arranged to be energized from the capacitor 42 which is charged from the full wave rectifier 40. The rectifier 40 is energized through resistors 50 from a secondary winding 51 of a transformer that is indicated, generally, at 52. The transformer 52 has a primary winding 53 that is connected for energization between the conductor 10 and ground. As soon as the voltage applied to the capacitor 42 is sufficient to render the space discharge device 45 conducting, it breaks down and allows the charge on the capacitor 42 to energize winding 38.

Associated with the reed switch 21 is a permanent magnet 54 having poles 55 and 56 at its distal ends adjacent the contact terminals 30 and 31 of the reed switch 21. As before the contacts 26 and 27 are biased by the inherent resiliency of the arms 24 and 25 to the open position. They are biased toward the closing position by the permanent magnet 54 with a force that is less than the amount necessary to effect closure of the contacts 26 and 27. When the winding 38 is energized additional biasing action is applied to the arms 24 and 25 of the reed switch 21 sufficient to close the contacts 26 and 27 with the assistance of the permanent magnet 54. As long as normal load current flows in the conductor 10 or it remains energized, the contacts 26 and 27 remain closed. On the occurrence of fault current flow in the conductor 10, the fuse 11 blows to open the circuit. The proper half cycle of alternating magnetic flux around the conductor 10 on flow of fault current therethrough is sufficient to overcome the magnetizing action applied by the winding 38 to the arms 24 and 25. As a result the contacts 26 and 27 are opened under the inherent spring biasing action of the arms 24 and 25 and they remain open until the fault is removed from the conductor 10. As soon as the conductor 10 is deenergized on blowing of the fuse 11, the primary winding 53 of the transformer 52 is deenergized and magnetizing pulses from the capacitor 42 no longer are applied to the winding 38.

Figure 4:
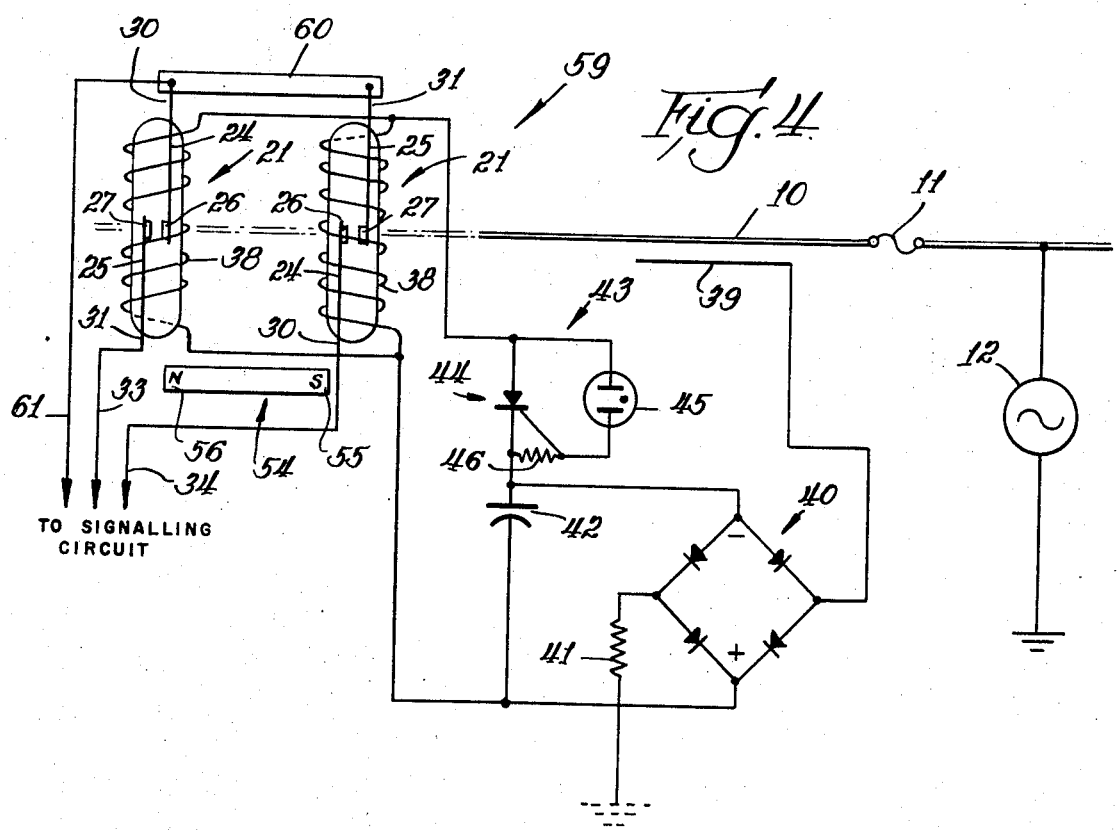

FIG. 4 shows a system generally at 59 which is similar to the signalling system 49 shown in FIG. 3 and described above. Here two reed switches 21 are employed and are connected in series circuit relation. In this embodiment of the invention the permanent magnet 54 is located adjacent the contact terminals 30 and 31 of the reed switches 21 while a ferromagnetic conductive connection 60 is located adjacent the contact terminals 30 and 31, as shown, and interconnects them both electrically and magnetically. Another conductor 61 extends to the signalling circuit in addition to the conductors 33 and 34. The conductor 61 is connected to the common connections between the contact terminals 30 and 31.

The windings 38 of the reed switches 21 are connected in parallel and are arranged to be energized through the trigger circuit 43 from capacitor 42 which is charged by full wave rectifier 40 that is energized between a counterpoise 39 adjacent the conductor 10 and through resistor 41 to ground. As before the permanent magnet 54 has insufficient magnetic force to effect closure of the two sets of contacts 26 and 27. Additional magnetizing force is provided by the energization of the windings 38 so that, together with the magnetizing force provided by the permanent magnet 54 the contacts 26 and 27 are closed in series and the circuit to the conductors 33 and 34 is thereby completed.

On flow of fault current in the conductor 10, the fuse 11 blows and the rectifier 40 no longer is energized. Depending upon the polarity of the half cycle of alternating magnetic flux under fault circuit conditions that is generated around the conductor 10 one or the other of the reed switches 21 will be demagnetized and its contacts 26 and 27 will be separated. Through the use of the third conductor 61 it is possible to determine which of the sets of contacts 26 and 27 opened and thereby the direction of the flow of fault current.

I claim:

1. A signalling system for an alternating current conductor energized at a relatively high voltage above ground comprising: a reed switch containing a pair of magnetic contacts spring biased to one position for connection to a signalling circuit, a relatively low coercive force U-shaped magnetic core with the arms extending along the lines of alternating magnetic flux surrounding said conductor and generated by flow of alternating current in said conductor and their distal ends adjacent the terminals of said contacts of said reed switch, magnetizing winding means on said core, a trigger circuit, a capacitor connected in series with said trigger circuit and across said magnetizing winding means, rectifier means connected to charge said capacitor, and circuit means for electrostatic connection between said conductor and ground for energizing said rectifier means, said trigger circuit periodically discharging said capacitor through said winding means to magnetize said core and hold said contacts in another position, said core being demagnetized by said alternating magnetic flux around said conductor on flow therethrough of alternating current above a predetermined value to shift said contacts to said one position.

2. Signalling system according to claim 1 wherein a hollow insulator for supporting said conductor has said signalling system enclosed therein.

3. Signalling system according to claim 1 wherein said contacts are spring biased to open position.

4. Signalling system according to claim 1 wherein the longitudinal axis of said reed switch is transverse to the longitudinal axes of said arms.

5. Signalling system according to claim 1 wherein said magnetizing means comprises a winding on one of said arms of said core.

6. Signalling system according to claim 1 wherein said magnetizing means comprises a winding on each arm of said core.

7. Signalling system according to claim 1 wherein said trigger circuit includes gated semiconductor means shunted by a space discharge device rendered conducting when the charge on said capacitor reaches a predetermined value.

8. Signalling system according to claim 1 wherein circuit means interconnect said reed switch and said rectifier means to discharge said capacitor when said contacts occupy said other position to prevent application of repeated magnetizing pulses to said winding means from said capacitor, said magnetic core having sufficient retentivity to hold said contacts in said other position.

9. A signalling system for an alternating current conductor energized at a relatively high voltage above ground comprising: reed switch means containing at least one pair of magnetic contacts spring biased to one position for connection to a signalling circuit and for location adjacent said conductor with the longitudinal axis along the lines of magnetic flux surrounding said conductor generated by flow of alternating current in said conductor, a permanent magnet adjacent the terminals of said contacts and biasing them toward another position, winding means adjacent said reed switch means, and means for energization from said conductor for energizing said winding means with direct current to assist said permanent magnet means in shifting said contact means to said other position, the magnetic fields from said permanent magnet and said winding means being reduced by said alternating magnetic flux around said conductor on flow therethrough of alternating current above a predetermined value to shift said contacts to said one position.

10. Signalling system according to claim 9 wherein said reed switch means comprises a pair of reed switches connected in series circuit relation.

11. Signalling system according to claim 10 wherein a magnetic shunt is located adjacent corresponding ends of said reed switches, and said permanent magnet is located adjacent the other ends of said reed switches.

12. Signalling system according to claim 9 wherein the biasing action of said permanent magnet is less than that required to shift said contacts to said other position, and said winding means surrounds said reed switch and when energized shifts said contact means to said other position.

13. Signalling system according to claim 9 wherein said means for energizing said winding means comprises rectifier means energized by alternating current derived from said conductor to charge a capacitor connected in series with a space discharge device across said winding means and rendered conducting when said capacitor is charged to a predetermined value.

14. Signalling system according to claim 13 wherein said rectifier means is energized from the secondary winding of a transformer the primary winding of which is energized from said conductor.

15. Signalling system according to claim 13 wherein said rectifier means is energized through electrostatic connecting means from said conductor.

16. Signalling system according to claim 9 wherein said means for energizing said winding means comprises rectifier means energized by alternating current derived from said conductor to charge a capacitor connected in series with gated semiconductor means triggered by a space discharge device rendered conducting when the charge on said capacitor reaches a predetermined value.

* * * * *